(12) United States Patent
Haider et al.

(10) Patent No.: US 12,182,585 B2
(45) Date of Patent: Dec. 31, 2024

(54) COMPUTER SYSTEM EXECUTING MULTIPLE OPERATING SYSTEMS

(71) Applicant: Jolla Ltd., Tampere (FI)

(72) Inventors: Franz-Josef Haider, Tampere (FI); Marko Saukko, Pirkkala (FI)

(73) Assignee: Jolla Ltd., Tampere (FI)

( * ) Notice: Subject to any disclaimer, the term of this patent is extended or adjusted under 35 U.S.C. 154(b) by 73 days.

(21) Appl. No.: 18/031,733

(22) PCT Filed: Oct. 28, 2021

(86) PCT No.: PCT/FI2021/050731
§ 371 (c)(1),
(2) Date: Apr. 13, 2023

(87) PCT Pub. No.: WO2022/090631
PCT Pub. Date: May 5, 2022

(65) Prior Publication Data
US 2024/0004670 A1  Jan. 4, 2024

(30) Foreign Application Priority Data
Oct. 29, 2020 (EP) .................................... 20204596

(51) Int. Cl.
*G06F 9/44* (2018.01)
*G06F 9/4401* (2018.01)

(52) U.S. Cl.
CPC ............ *G06F 9/441* (2013.01); *G06F 9/4411* (2013.01)

(58) Field of Classification Search
CPC ................................ G06F 9/441; G06F 9/4411
See application file for complete search history.

(56) References Cited

U.S. PATENT DOCUMENTS

| | | |
|---|---|---|
| 2006/0259292 A1 | 11/2006 | Solomon et al. |
| 2007/0074192 A1 | 3/2007 | Geisinger |
| 2012/0081353 A1 | 4/2012 | Yusupov et al. |
| 2012/0084480 A1 | 4/2012 | Reeves et al. |
| 2014/0366022 A1 | 12/2014 | Chinnamani et al. |
| 2020/0183729 A1 | 6/2020 | Lu et al. |

OTHER PUBLICATIONS

European Patent Office, International Search Report and the Written Opinion of the International Searching Authority, Application No. PCT/FI2021/050731, Mailed Feb. 25, 2022, 15 pages.

*Primary Examiner* — Zahid Choudhury
(74) *Attorney, Agent, or Firm* — Ziegler IP Law Group LLC.

(57) ABSTRACT

A first operating system and a second operating system are executed by a processor of a computing device. The first operating system has a first user space on which a first user space driver is executed. The second operating system has a second user space on which a second user space driver is executed. A common kernel driver is executed on a common kernel to determine which user space driver made a given function call to the common kernel driver and translate the given function call into a corresponding hardware-specific call, based on said determination. The common kernel driver enables the first user space driver and the second user space driver to access computer hardware of the computing device simultaneously.

16 Claims, 3 Drawing Sheets

COMPUTER SYSTEM EXECUTING MULTIPLE OPERATING SYSTEMS

TECHNICAL FIELD

The present disclosure relates to computing devices executing multiple operating systems. Moreover, the present disclosure also relates to methods for facilitating concurrent execution of multiple operating systems on a same computing device.

BACKGROUND

Operating systems are system software that are responsible for the control and management of computer resources. Typically, an operating system enables communication between application software and computer hardware of a computing device. Specifically, the operating system allows the application software to access the computer hardware to perform basic system operations of the computing device, such as disk access, memory management, task scheduling, and user interfacing. Furthermore, the operating systems are responsible for providing network connectivity.

Notably, every operating system has its own set of features and drawbacks. Some operating systems may be full featured, with an extensive set of capabilities, while other operating systems may be capable of faster processing. Additionally, various applications may be written to be executed within one operating system but may not be supported by another operating system. Due to such variation in functionalities of the operating systems, a user may want to access functionalities from two or more operating systems on a same computer hardware.

Figure 1:
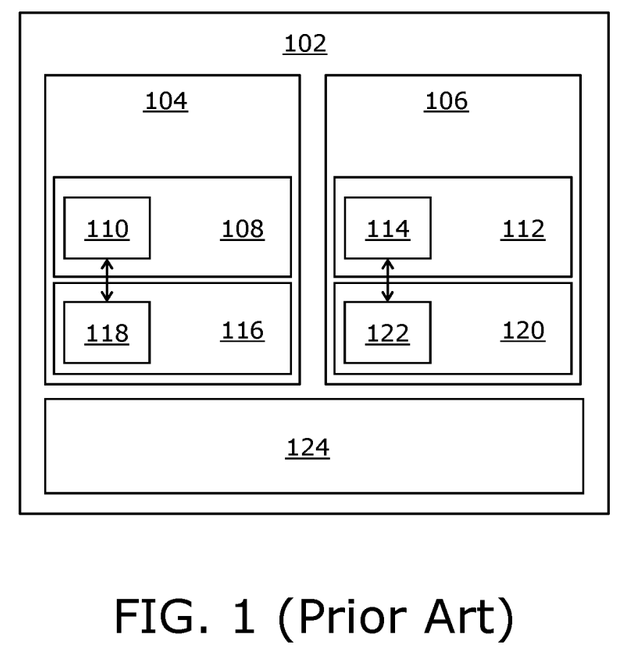
FIG. 1 (Prior Art) is a block diagram illustrating a conventional manner of executing two operating systems on a computing device.

FIG. 1 (Prior Art) is a block diagram illustrating a conventional manner of executing two operating systems, namely a first operating system 104 and a second operating system 106 on a computing device 102. Herein, the first operating system 104 has a first user space 108 and a first kernel 116, the first user space 108 having a first user space driver 110 and the first kernel 116 having a first kernel driver 118. Similarly, the second operating system 106 has a second user space 112 and a second kernel 120, the second user space 112 having a second user space driver 114 and the second kernel 120 having a second kernel driver 122. The first kernel driver 118 is configured to provide the first user space driver 110 with access to computer hardware 124 associated with the computing device 102. The second kernel driver 122 is configured to provide the second user space driver 114 with access to the computer hardware 124 associated with the computing device 102. Notably, user spaces, such as the first user space 108 and the second user space 112, communicate with the first kernel 116 and the second kernel 120, respectively. It will be appreciated that a user space driver and a kernel space driver are specific to a given operating system and are not compatible with drivers of other operating systems. For example, the first kernel driver 118 is not compatible with the second user space driver 114 and the second kernel driver 122 is not compatible with the first user space driver 110.

Conventionally, techniques such as dual-boot, virtual machines, emulators and containers have been used to access functionality of two or more operating systems on a same computer hardware. However, such conventional techniques do not support hardware acceleration while providing simultaneous access of hardware features to the operating systems. Furthermore, techniques such as dual boot allow functioning of two operating systems on one computer hardware but do not provide concurrent access to both the operating systems. In a computing device employing a hosted virtual machine, a guest operating system runs on a virtual machine in a host operating system, thereby allowing concurrent access of computer hardware to both the operating systems. However, the performance of the computing device using the hosted virtual machine is significantly reduced due to virtualization of hardware resources for the guest operating system. Another method of providing access to the computer hardware to multiple operating systems involves using wrappers or inter-process communication (IPC) between drivers. However, such methods significantly increase complexity and often drastically reduce performance as many user space drivers are only available in binary form and cannot be modified.

Therefore, in light of the foregoing discussion, there exists a need to overcome the aforementioned drawbacks associated with conventional methods to access functionality of two or more operating systems on a same computer hardware.

SUMMARY

The present disclosure seeks to provide a computing device that facilitates concurrent execution of multiple operating systems. The present disclosure also seeks to provide a method for facilitating concurrent execution of multiple operating systems on a same computing device. The present disclosure seeks to provide a solution to the existing problems of driver incompatibility, limited hardware access and considerable performance overhead in conventional solutions for using multiple operating systems on a same computing device. An aim of the present disclosure is to provide a solution that overcomes at least partially the problems encountered in prior art.

In a first aspect, an embodiment of the present disclosure provides a computing device comprising:
  a memory having computer-executable instructions stored thereon; and
  a processor coupled to the memory, wherein the computer-executable instructions, when executed on the processor, cause the processor to:
    execute a first operating system and a second operating system having a first user space and a second user space, respectively, wherein the first operating system and the second operating system have a common kernel that is shared therebetween;
    execute a first user space driver and a second user space driver on the first user space and the second user space, respectively; and
    execute a common kernel driver on the common kernel to:
      determine which one of the first user space driver and the second user space driver made a given function call to the common kernel driver; and
      translate the given function call into a corresponding hardware-specific call, based on a determination of the one of the first user space driver and the second user space driver that made the given function call to the common kernel driver, thereby enabling the one of the first user space driver and the second user space driver to access computer hardware of the computing device, wherein the common kernel driver enables the first user space driver and the second user space driver to access the computer hardware simultaneously.

In a second aspect, an embodiment of the present disclosure provides a method comprising:

executing a first operating system and a second operating system having a first user space and a second user space, respectively, on a computing device, wherein the first operating system and the second operating system have a common kernel that is shared therebetween;

executing a first user space driver and a second user space driver on the first user space and the second user space, respectively; and     executing a common kernel driver on the common kernel to:

determine which one of the first user space driver and the second user space driver made a given function call to the common kernel driver; and         translate the given function call into a corresponding hardware-specific call, based on a determination of the one of the first user space driver and the second user space driver that made the given function call to the common kernel driver, thereby enabling the one of the first user space driver and the second user space driver to access computer hardware of the computing device, wherein the common kernel driver enables the first user space driver and the second user space driver to access the computer hardware simultaneously.

Embodiments of the present disclosure substantially eliminate or at least partially address the aforementioned problems in the prior art, enable concurrent execution of multiple operating systems on a same computing device and facilitate simultaneous access of computer hardware of the computing device to different user space drivers of the aforesaid operating systems, without any considerable performance penalty.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 2A is a block diagram illustrating a computing device, while

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computing device comprising:

a memory having computer-executable instructions stored thereon; and     a processor coupled to the memory, wherein the computer-executable instructions, when executed on the processor, cause the processor to:

execute a first operating system and a second operating system having a first user space and a second user space, respectively, wherein the first operating system and the second operating system have a common kernel that is shared therebetween;

execute a first user space driver and a second user space driver on the first user space and the second user space, respectively; and         execute a common kernel driver on the common kernel to:

determine which one of the first user space driver and the second user space driver made a given function call to the common kernel driver; and             translate the given function call into a corresponding hardware-specific call, based on a determination of the one of the first user space driver and the second user space driver that made the given function call to the common kernel driver, thereby enabling the one of the first user space driver and the second user space driver to access computer hardware of the computing device, wherein the common kernel driver enables the first user space driver and the second user space driver to access the computer hardware simultaneously.

In a second aspect, an embodiment of the present disclosure provides a method comprising:

executing a first operating system and a second operating system having a first user space and a second user space, respectively, on a computing device, wherein the first operating system and the second operating system have a common kernel that is shared therebetween;

executing a first user space driver and a second user space driver on the first user space and the second user space, respectively; and     executing a common kernel driver on the common kernel to:

determine which one of the first user space driver and the second user space driver made a given function call to the common kernel driver; and translate the given function call into a corresponding hardware-specific call, based on a determination of the one of the first user space driver and the second user space driver that made the given function call to the common kernel driver, thereby enabling the one of the first user space driver and the second user space driver to access computer hardware of the computing device, wherein the common kernel driver enables the first user space driver and the second user space driver to access the computer hardware simultaneously.

Determining and translating functions calls made by the first user space driver as well as function calls made by the second user space driver enables the common kernel driver to provide the first user space driver and the second user space driver with simultaneous access to the computer hardware. In this way, the common kernel driver enables the aforesaid computing device to execute multiple operating systems (such as the first operating system and the second operating system) simultaneously (namely, concurrently). Pursuant to embodiments of the present disclosure, a user can switch between the first operating system and the second operating system on the fly. Moreover, the common kernel driver provides the first operating system and the second operating system with access to the computer hardware without any considerable performance penalty. Furthermore, the common kernel driver provides said access to the computer hardware, without requiring virtualization of the computer hardware, and without a need to employ wrappers on top of existing computer hardware drivers.

Moreover, the common kernel driver provides a given functionality of a given operating system with hardware-accelerated access, thereby implementing the given functionality on the computer hardware. The given functionality can be a hardware-specific functionality. Examples of such a hardware-specific functionality include, but are not limited to, graphics processing, audio processing, facilitating communication, obtaining an input, providing an output. Providing such a hardware-accelerated access decreases latency and increases performance of the computing device.

In some implementations, the first operating system and the second operating system are existing operating systems. In such implementations, the common kernel driver is generated by merging a functionality of a first kernel driver with a functionality of a second kernel driver, wherein the first kernel driver and the second kernel driver are existing kernel drivers that are otherwise known to be used in the first operating system and the second operating system, respectively. In other words, the first kernel driver and the second kernel driver are existing kernel drivers that are known to be used in the first operating system and the second operating system conventionally, namely without the present solution provided by the present disclosure. The first kernel driver and the second kernel driver have different driver application programming interfaces (APIs). Thus, the common kernel driver is implemented as a driver API that is compatible with the different driver APIs of the first kernel driver and the second kernel driver.

Throughout the present disclosure, the term "common kernel" refers to a kernel that is shared between the first operating system and the second operating system, and the term "common kernel driver" refers to a kernel driver that executes on the common kernel and that is shared between the first user space driver and the second user space driver to provide them with hardware-access functionality.

Pursuant to embodiments of the present disclosure, a system memory of the computing device is divided between the first user space, the second user space and the common kernel. Without the present solution provided by the present disclosure, the system memory would have to be divided between the first operating system and the second operating system, wherein apart from the first user space and the second user space, different parts of the system memory would have to be utilized for different kernels of the first operating system and the second operating system.

The functionality of the first kernel driver and the functionality of the second kernel driver are effectively merged to generate the common kernel driver, in a manner that the common kernel driver is compatible with both the first user space driver and the second user space driver. Optionally, the functionality of the first kernel driver is merged with the functionality of the second kernel driver at a level of calling conventions known to be used in function calls made in the first kernel driver and the second kernel driver. By "merging the functionalities at the level of calling conventions", it is meant that the common kernel driver is configured to understand and differentiate between function calls made by the first user space driver and function calls made by the second user space driver and serve the first user space driver and the second user space driver, accordingly.

It will be appreciated that apart from function calls that need to be translated to provide hardware access, the first user space driver and the second user space driver could make other function calls to the kernel driver that do not have any immediate effect on the computer hardware. The other function calls may, for example, be made to set parameters in the common kernel that may then be used in further function calls made to the common kernel driver.

Moreover, optionally, the common kernel driver is generated by modifying the first kernel driver to include the functionality of the second kernel driver. It will be appreciated that modifying an existing kernel driver (that is known conventionally) to include the functionality of another kernel driver is an easier way to generate the common kernel driver, as compared to generating the common kernel driver from scratch.

Pursuant to embodiments of the present disclosure, the first user space driver and the second user space driver are not required to be modified. The first user space driver and the second user space driver make function calls to the common kernel driver in a similar manner as they would have made to the first kernel driver and the second kernel driver conventionally, without the present solution.

It will be appreciated that the first user space driver and the second user space driver are typically available in a binary form and cannot be modified. However, a given kernel driver can be modified by a developer who has access to a software code of the given kernel driver. For an operating system that is open source, a software code of its kernel driver is available freely, and hence can be modified by anyone. On the other hand, for an operating system that is closed source, a software code of its kernel driver is not available freely, and hence can be modified by only those software developers who are authorised to access and modify the software code.

Throughout the present disclosure, the term "computing device" refers to an electronic device that is capable of processing data. The computing device may or may not be portable. Examples of computing devices include, but are not limited to, desktop computers, laptop computers, tablet computers, phablet computers, personal digital assistants, smartphones, and smart devices (for example, such as smart watches, smart locks, smart televisions).

The computing device may comprise at least one storage medium for storing the first operating system and the second operating system. The at least one storage medium may be a non-volatile storage medium. Optionally, the at least one storage medium is implemented as a hard disk drive of the computing device. In some embodiments, the hard disk drive is arranged as an internal component of the computing device, whereas in other embodiments, the hard disk drive is arranged as an external component of the computing device.

Throughout the present disclosure, the term "computer hardware" refers to hardware components of the computing device. Examples of computer hardware include at least one of, but are not limited to, a graphics card, a sound card, speakers, a monitor, an input device (for example, such as a mouse, a keyboard, a stylus, and the like), a computer data storage (for example, such as a disk drive, a Universal Serial Bus (USB) drive, a memory card, and the like), a power supply unit, and a printer.

Throughout the present disclosure, the term "operating system" refers to a software that enables a user to run applications on the computing device. A given operating system manages hardware, software and the applications on the computing device, by performing tasks such as file management, device management, memory management, process management, and the like. The given operating system serves as an interface between a user and the computer hardware.

Pursuant to embodiments of the present disclosure, the first operating system and the second operating system can be either fully POSIX-compliant or mostly POSIX-compliant, wherein POSIX stands for Portable Operating System Interface (POSIX). Some examples of such operating systems are Microsoft Windows® operating systems, Apple Macintosh® operating systems (macOS), Linux® operating systems, Linux-based operating systems, Android® operating systems, and Apple iOS® operating systems.

Throughout the present disclosure, the terms "first operating system" and "second operating system" are used herein to distinguish between different operating systems that are executed on the computing device. In some implementations, the different operating systems are Application Binary Interface (ABI)-incompatible. In other implementations, the different operating systems could include different downstream versions of a particular operating system. As an example, the first operating system could conventionally have a first downstream Linux® kernel on which a kernel driver 'A' runs, whereas the second operating system could conventionally have a second downstream Linux® kernel on which a kernel driver 'B' runs. In such a case, the common kernel can be implemented as either the first downstream Linux® kernel or the second downstream Linux® kernel, and the common kernel driver is generated by merging the kernel driver 'A' with the kernel driver 'B'.

As another example, the first operating system may be a Linux-based operating system (for example, such as Sailfish operating system), whereas the second operating system may be an Android® operating system. In such an example, the common kernel enables use of both android applications and sailfish applications on the same computing device. Thus, the computing device is susceptible to be beneficially employed for prototyping and demonstration of software applications on multiple operating systems.

According to an embodiment, the computer-executable instructions, when executed, cause the processor to employ a handler of the common kernel driver to determine which one of the first user space driver and the second user space driver made the given function call to the common kernel driver, based on differences in attributes of a first parameter and attributes of a second parameter, when the first user space driver and the second user space driver access the common kernel driver via a same path, wherein the first parameter and the second parameter are passed by the first user space driver and the second user space driver, respectively, to the common kernel driver.

Hereinabove, the term "handler" refers to a software routine that is specialized in a certain task. The handler of the common kernel may, for example, be an event handler that selects parameters passed by the first user space driver and the second user space driver, upon receiving function calls from the first user space driver and the second user space driver, respectively. Such function calls serve as an interface through which applications executing in the first user space and the second user space request services from the common kernel driver.

When the first user space driver and the second user space driver access the common kernel driver via the same path, the function calls typically pertain to device management services. Such device management services encompass hardware management services, for example, such as requesting for a hardware resource, operating the hardware resource in a specific manner, and the like. In an example, both the first user space driver and the second user space driver access the common kernel driver via a given user space path (/dev/driver path).

It will be appreciated that function calls from the first user space driver and function calls from the second user space driver can be easily distinguished by the handler, as the attributes of the first parameter passed by the first user space driver to the common kernel driver are often different from the attributes of the second parameter passed by the second user space driver to the common kernel driver.

Optionally, the attributes of the first parameter and the attributes of the second parameter comprise at least one of: a data size, a data type, a data order.

The data size of a given parameter can be, for example, 4 bits, 8 bits, 16 bits, 32 bits, 64 bits or similar. As an example, the data size of the first parameter could be 16 bits, whereas the data size of the second parameter could be 32 bits. Thus, differences in the data size of the first parameter and the data size of the second parameter enable the handler to determine which one of the first user space driver and the second user space driver has made the given function call.

Likewise, differences in the data type enable the handler to determine which one of the first user space driver and the second user space driver has made the given function call. A data type of a given parameter can be either a basic data type or a composite data type. Examples of the basic data type include, but are not limited to, an integer data type, a float data type, and a character data type. Examples of the composite data type include, but are not limited to, a pointer data type, an array data type, a structure data type, a union data type, and a function data type.

Moreover, an order in which first parameters are passed by the first user space driver may be different from an order in which second parameters are passed by the second user space driver. Thus, differences in the data order enable the handler to determine which one of the first user space driver and the second user space driver has made the given function call. In an example, the first user space driver may pass parameters A and B to the common kernel driver in the order: A, B. However, the second user space driver may also pass the same parameters A and B to the common kernel driver, but in the order: B, A. In such a case, the data order of the parameters passed by the first user space driver is different from the data order of the parameters passed by the second user space driver. In such a case, a manner in which the parameters A and B are popped from a system stack depends on the selection of the parameters by the handler. When the handler selects the parameters A and B passed by the first user space driver, said parameters are popped from the system stack in the order: A, B. Otherwise, when the handler selects the parameters A and B passed by the second user space driver, said parameters are popped from the system stack in the order: B, A.

According to another embodiment, the computer-executable instructions, when executed, cause the processor to employ a handler of the common kernel driver to determine which one of the first user space driver and the second user space driver made the given function call to the common kernel driver, based on at least one symbolic link or a bind mount provided in a given path, when the first user space driver and the second user space driver access the common kernel driver via a first path and a second path, respectively.

When the first path is different from the second path, a given symbolic link or a given bind mount in a given path enables the handler to determine which one of the first user space driver and the second user space driver has made the given function call. In other words, the first user space driver and the second user space driver are registered to access the common kernel driver via different paths. Notably, the at least one symbolic link or the bind mount are indicative of one of: a link from the first user space driver in the first user space to the common kernel driver in the common kernel, a link from the second user space driver in the second user space to the common kernel driver in the common kernel. In other words, the at least one symbolic link or the bind mount is employed to link different user spaces (such as the first user space and the second user space) with the common kernel.

As an example, a primary device node and a secondary device node are exposed to the first user space driver and the second user space driver, respectively. While the first user space driver uses the primary device node, the second user space driver uses the secondary device node by symlinking or bind-mounting the secondary device node.

As another example, the common kernel driver provides two different interfaces, for example, such as/dev/driver and /dev/driver_u2 to the first user space driver and the second user space driver, respectively. The first user space driver accesses a primary interface /dev/driver from the common kernel driver as it was initially intended, while the second user pace driver accesses a secondary interface /dev/driver_u2 via a bind-mount or symbolic link, such that no modification to the second user space driver is required. The common kernel driver then determines which one of the first user space driver and the second user space driver made the given function call to the common kernel driver, by checking which of the two interfaces (namely, /dev/driver or /dev/driver_u2) is called by the one of the first user pace driver and the second user space driver.

According to yet another embodiment, the computer-executable instructions, when executed, cause the processor to employ a handler of the common kernel driver to determine which one of the first user space driver and the second user space driver made the given function call to the common kernel driver, based on a difference between a first driver configuration and a second driver configuration employed by the first user space driver and the second user space driver, respectively. In this regard, the first user space driver and the second user space driver support selecting device nodes via the first driver configuration and the second driver configuration, respectively, without modifying them.

The present disclosure also relates to the method as described above. Various embodiments and variants disclosed above, with respect to the aforementioned first aspect, apply mutatis mutandis to the method.

Optionally, in the method, the first operating system and the second operating system are existing operating systems, the common kernel driver being generated by merging a functionality of a first kernel driver with a functionality of a second kernel driver, wherein the first kernel driver and the second kernel driver are existing kernel drivers that are otherwise known to be used in the first operating system and the second operating system, respectively.

Optionally, in the method, the common kernel driver is generated by modifying the first kernel driver to include the functionality of the second kernel driver.

Moreover, optionally, the functionality of the first kernel driver is merged with the functionality of the second kernel driver at a level of calling conventions known to be used in function calls made in the first kernel driver and the second kernel driver.

According to an embodiment, the method further comprises employing a handler of the common kernel driver to determine which one of the first user space driver and the second user space driver made the given function call to the common kernel driver, based on differences in attributes of a first parameter and attributes of a second parameter, when the first user space driver and the second user space driver access the common kernel driver via a same path, wherein the first parameter and the second parameter are passed by the first user space driver and the second user space driver, respectively, to the common kernel driver.

Optionally, in this regard, the attributes of the first parameter and the attributes of the second parameter comprise at least one of: a data size, a data type, a data order.

According to another embodiment, the method further comprises employing a handler of the common kernel driver to determine which one of the first user space driver and the second user space driver made the given function call to the common kernel driver, based on at least one symbolic link or a bind mount provided in a given path, when the first user space driver and the second user space driver access the common kernel driver via a first path and a second path, respectively.

According to yet another embodiment, the method further comprises employing a handler of the common kernel driver to determine which one of the first user space driver and the second user space driver made the given function call to the common kernel driver, based on a difference between a first driver configuration and a second driver configuration employed by the first user space driver and the second user space driver, respectively.

EXAMPLES

Example 1

Hereinbelow, there is provided an exemplary program (in C programming language) pursuant to an embodiment wherein the first user space driver and the second user space driver access the common kernel driver via the same path.

```
// K1 (for functionality of first kernel driver)
struct userspace_type_KD1
    // datatypes are only examples
    u32 var1;
    u64 var2;
    void *var3;
    ...
};
void handler_kd1 (userspace_input) {
    userspace_type_KD1 data;
    copy userspace_input into data;
    process data
}
// K2 (for functionality of second kernel driver)
struct userspace_type_KD2 {
    // datatypes are only examples
    u64 var1;
    u64 var2;
    void *var3;
    ...
};
void handler_kd2(userspace_input) {
    userspace_type_KD2 data;
    copy userspace_input into data;
    process data
}
// K3 (common kernel driver with merged functionalities)
// have both userspace datatypes userspace_type_KD1 and
userspace_type_KD2
void handler_kd1_kd2(userspace_input) {
    userspace_type_KD1 data1;
    userspace_type_KD2 data2;
    if input_size == sizeof (userspace_type_KD1)
        copy userspace_input into data1;
    if input_size == sizeof (userspace_type_KD2)
        copy userspace_input into data2;
    process data1 or data2 depending on input_size
}
Example 2. Hereinbelow, there is provided an exemplary program (in
C
programming language) pursuant to an embodiment wherein the first
user space driver and the second user space driver access the common
kernel driver via the first path and the second path, respectively.
// K1 (for functionality of first kernel driver)
struct userspace_type_KD1 {
    // datatypes are only examples
    u32 var1;
    u64 var2;
    void *var3;
    ...
};
void init_kd1( )
{
    register_userspace_device("device_kd1");
}
void handler_kd1 (userspace_input) {
    userspace_type_KD1 data;
    copy userspace_input into data;
    process data
}
// K2 (for functionality of second kernel driver)
struct userspace_type_KD2 {
    // datatypes are only examples
    u64 var1;
    u64 var2;
    void *var3;
    ...
};
void init_kd2( )
{
    register_userspace_device("device_kd2");
}
void handler_kd2(userspace_input) {
    userspace_type_KD2 data;
    copy userspace_input into data;
    process data
}
// K3 (common kernel driver with merged functionalities)
// have both userspace datatypes here
void init_kd1_kd2( )
{
    register_userspace_device("device_kd1");
    register_userspace_device("device_kd2");
}
void dispatch( )
{
    if input from "device_kd1" call handler_kd1
    if input from "device_kd2" call handler_kd2
}
```

DETAILED DESCRIPTION OF THE DRAWINGS

Figure 2A:
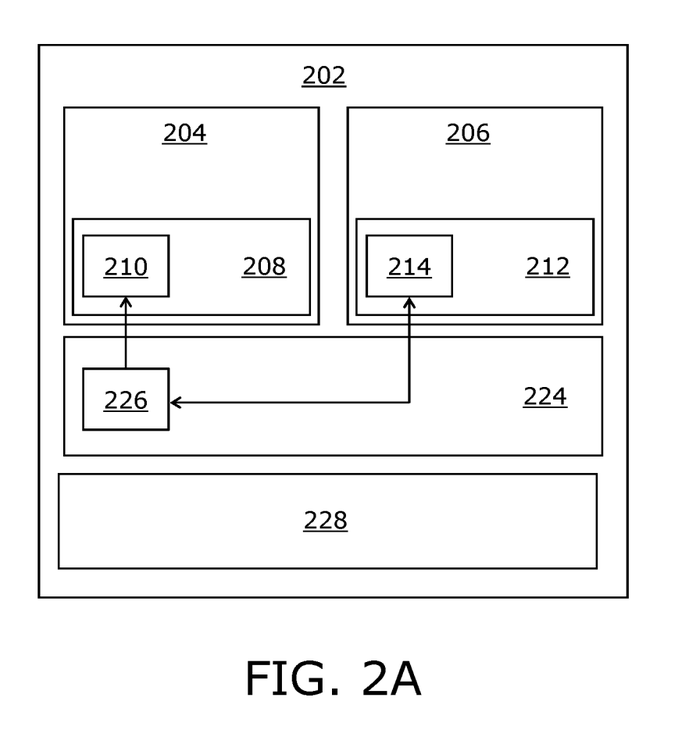

Referring to FIG. 2A, there is shown a block diagram illustrating a computing device 202, in accordance with an embodiment of the present disclosure. A first operating system 204 and a second operating system 206 are executed by a processor of the computing device 202. The first operating system 204 has a first user space 208 on which a first user space driver 210 is executed. The second operating system 206 has a second user space 212 on which a second user space driver 214 is executed. A common kernel driver 226 is executed on a common kernel 224 to:
  determine which one of the first user space driver 210 and the second user space driver 214 made a given function call to the common kernel driver 226; and
  translate the given function call into a corresponding hardware-specific call, based on a determination of the one of the first user space driver 210 and the second user space driver 214 that made the given function call to the common kernel driver 210, thereby enabling the one of the first user space driver 210 and the second user space driver 214 to access computer hardware 228 of the computing device 202.

In this way, the common kernel driver 226 enables the first user space driver 210 and the second user space driver 214 to access the computer hardware 228 simultaneously.

Figure 2B:
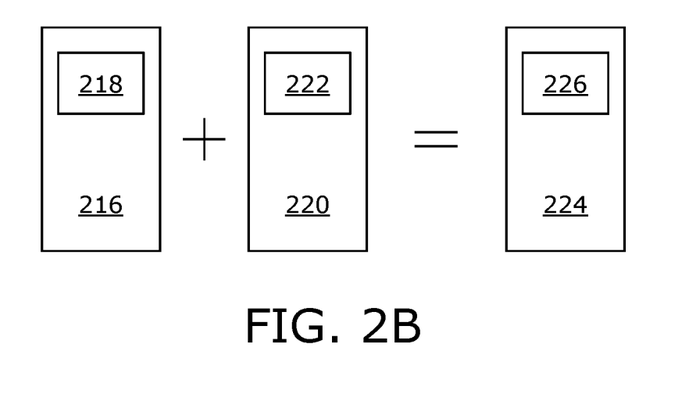
FIG. 2B is a block diagram depicting merging of a functionality of a first kernel driver and a functionality of a second kernel driver, in accordance with an embodiment of the present disclosure.

With reference to FIG. 2B, there is illustrated an implementation in which the first operating system 204 and the second operating system 206 are existing operating systems. The common kernel driver 226 is generated by merging a functionality of a first kernel driver 218 with a functionality of a second kernel driver 222, which are existing kernel drivers that are otherwise known to be used in the first operating system 204 and the second operating system 206, respectively. The common kernel 224 can be either of a first kernel 216 and a second kernel 220, which are existing kernels otherwise known to be used in the first operating system 204 and the second operating system 206, respectively.

Figure 3:
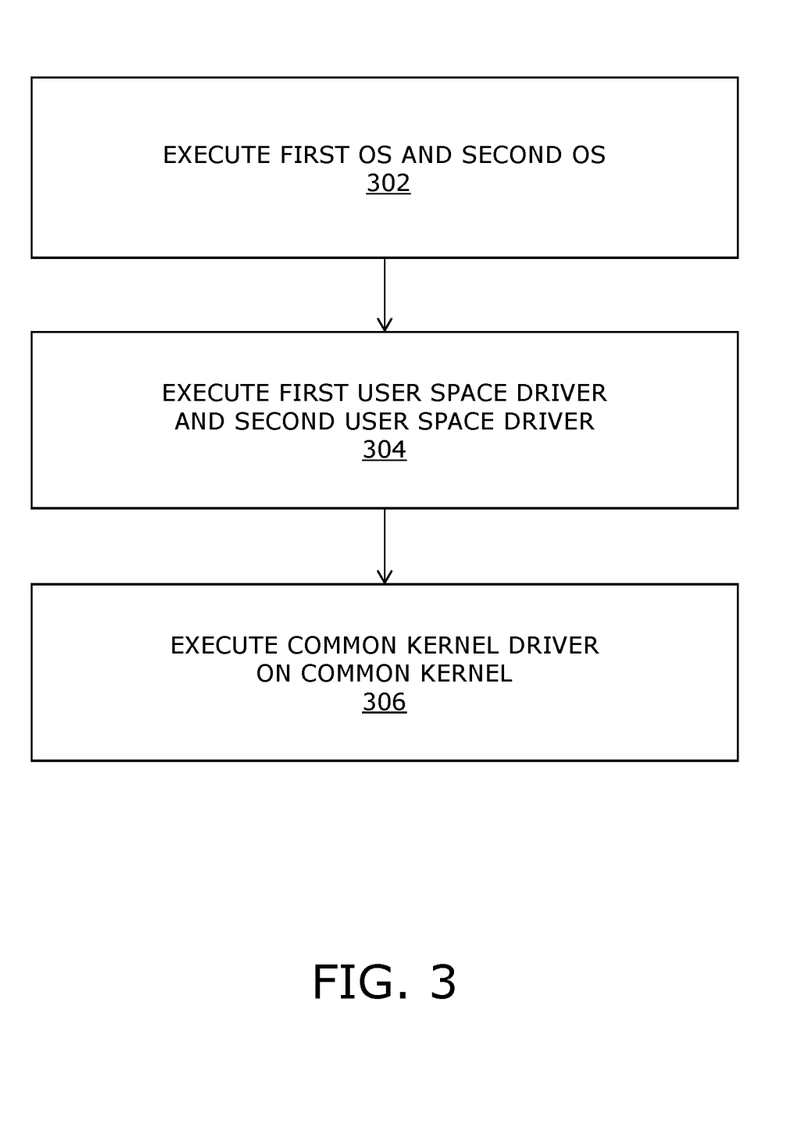
FIG. 3 is a flowchart depicting steps of a method for facilitating concurrent execution of multiple operating systems on a same computing device, in accordance with an embodiment of the present disclosure.

Referring to FIG. 3, there is shown a flowchart depicting steps of a method for facilitating concurrent execution of multiple operating systems on a same computing device, in accordance with an embodiment of the present disclosure. At a step 302, a first operating system and a second operating system having a first user space and a second user space, respectively, are executed on a computing device, wherein the first operating system and the second operating system have a common kernel that is shared therebetween. At a step 304, a first user space driver and a second user space driver are executed on the first user space and the second user space, respectively. At a step 306, a common kernel driver is executed on the common kernel. In the step 306, when a given function call is received by the common kernel driver, it is determined which one of the first user space driver and the second user space driver made the given function call. Subsequently, the given function call is translated into a corresponding hardware-specific call, based on a determination of the one of the first user space driver and the second user space driver that made the given function call to the common kernel driver, thereby enabling the one of the first user space driver and the second user space driver to access computer hardware of the computing device. In this way, the common kernel driver enables the first user space driver and the second user space driver to access the computer hardware simultaneously.

The steps 302, 304 and 306 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A computing device comprising:
a memory having computer-executable instructions stored thereon; and
a processor coupled to the memory, wherein the computer-executable instructions, when executed on the processor, cause the processor to:
execute a first operating system and a second operating system having a first user space and a second user space, respectively, wherein the first operating system and the second operating system have a common kernel that is shared therebetween;
execute a first user space driver and a second user space driver on the first user space and the second user space, respectively; and
execute a common kernel driver on the common kernel to:
determine which one of the first user space driver and the second user space driver made a given function call to the common kernel driver; and
translate the given function call into a corresponding hardware-specific call, based on a determination of the one of the first user space driver and the second user space driver that made the given function call to the common kernel driver, thereby enabling the one of the first user space driver and the second user space driver to access computer hardware of the computing device,
wherein the common kernel driver enables the first user space driver and the second user space driver to access the computer hardware simultaneously.

2. The computing device of claim 1, wherein the first operating system and the second operating system are existing operating systems, the common kernel driver being generated by merging a functionality of a first kernel driver with a functionality of a second kernel driver, wherein the first kernel driver and the second kernel driver are existing kernel drivers that are otherwise known to be used in the first operating system and the second operating system, respectively.

3. The computing device of claim 2, wherein the common kernel driver is generated by modifying the first kernel driver to include the functionality of the second kernel driver.

4. The computing device of claim 2, wherein the functionality of the first kernel driver is merged with the functionality of the second kernel driver at a level of calling conventions known to be used in function calls made in the first kernel driver and the second kernel driver.

5. The computing device of claim 1, wherein the computer-executable instructions, when executed, cause the processor to employ a handler of the common kernel driver to determine which one of the first user space driver and the second user space driver made the given function call to the common kernel driver, based on differences in attributes of a first parameter and attributes of a second parameter, when the first user space driver and the second user space driver access the common kernel driver via a same path, wherein the first parameter and the second parameter are passed by the first user space driver and the second user space driver, respectively, to the common kernel driver.

6. The computing device of claim 5, wherein the attributes of the first parameter and the attributes of the second parameter comprise at least one of: a data size, a data type, a data order.

7. The computing device of claim 1, wherein the computer-executable instructions, when executed, cause the processor to employ a handler of the common kernel driver to determine which one of the first user space driver and the second user space driver made the given function call to the common kernel driver, based on at least one symbolic link or a bind mount provided in a given path, when the first user space driver and the second user space driver access the common kernel driver via a first path and a second path, respectively.

8. The computing device of claim 1, wherein the computer-executable instructions, when executed, cause the processor to employ a handler of the common kernel driver to determine which one of the first user space driver and the second user space driver made the given function call to the common kernel driver, based on a difference between a first driver configuration and a second driver configuration employed by the first user space driver and the second user space driver, respectively.

9. A method comprising:
executing a first operating system and a second operating system having a first user space and a second user space, respectively on a computing device, wherein the first operating system and the second operating system have a common kernel that is shared therebetween;
executing a first user space driver and a second user space driver on the first user space and the second user space, respectively; and
executing a common kernel driver on the common kernel to:
determine which one of the first user space driver and the second user space driver made a given function call to the common kernel driver; and
translate the given function call into a corresponding hardware-specific call, based on a determination of the one of the first user space driver and the second user space driver that made the given function call to the common kernel driver, thereby enabling the one of the first user space driver and the second user space driver to access computer hardware of the computing device, wherein the common kernel driver enables the first user space driver and the second user space driver to access the computer hardware simultaneously.

10. The method of claim 9, wherein the first operating system and the second operating system are existing operating systems, the common kernel driver being generated by merging a functionality of a first kernel driver with a functionality of a second kernel driver, wherein the first kernel driver and the second kernel driver are existing kernel drivers that are otherwise known to be used in the first operating system and the second operating system, respectively.

11. The method of claim 10, wherein the common kernel driver is generated by modifying the first kernel driver to include the functionality of the second kernel driver.

12. The method of claim 10, wherein the functionality of the first kernel driver is merged with the functionality of the second kernel driver at a level of calling conventions known to be used in function calls made in the first kernel driver and the second kernel driver.

13. The method of claim 9, further comprising employing a handler of the common kernel driver to determine which one of the first user space driver and the second user space driver made the given function call to the common kernel driver, based on differences in attributes of a first parameter and attributes of a second parameter, when the first user space driver and the second user space driver access the common kernel driver via a same path, wherein the first parameter and the second parameter are passed by the first user space driver and the second user space driver, respectively, to the common kernel driver.

14. The method of claim 13, wherein the attributes of the first parameter and the attributes of the second parameter comprise at least one of: a data size, a data type, a data order.

15. The method of any of claim 9, further comprising employing a handler of the common kernel driver to determine which one of the first user space driver and the second user space driver made the given function call to the common kernel driver, based on at least one symbolic link or a bind mount provided in a given path, when the first user space driver and the second user space driver access the common kernel driver via a first path and a second path, respectively.

16. The method of claim 9, further comprising employing a handler of the common kernel driver to determine which one of the first user space driver and the second user space driver made the given function call to the common kernel driver, based on a difference between a first driver configuration and a second driver configuration employed by the first user space driver and the second user space driver, respectively.

* * * * *